Figure 1:
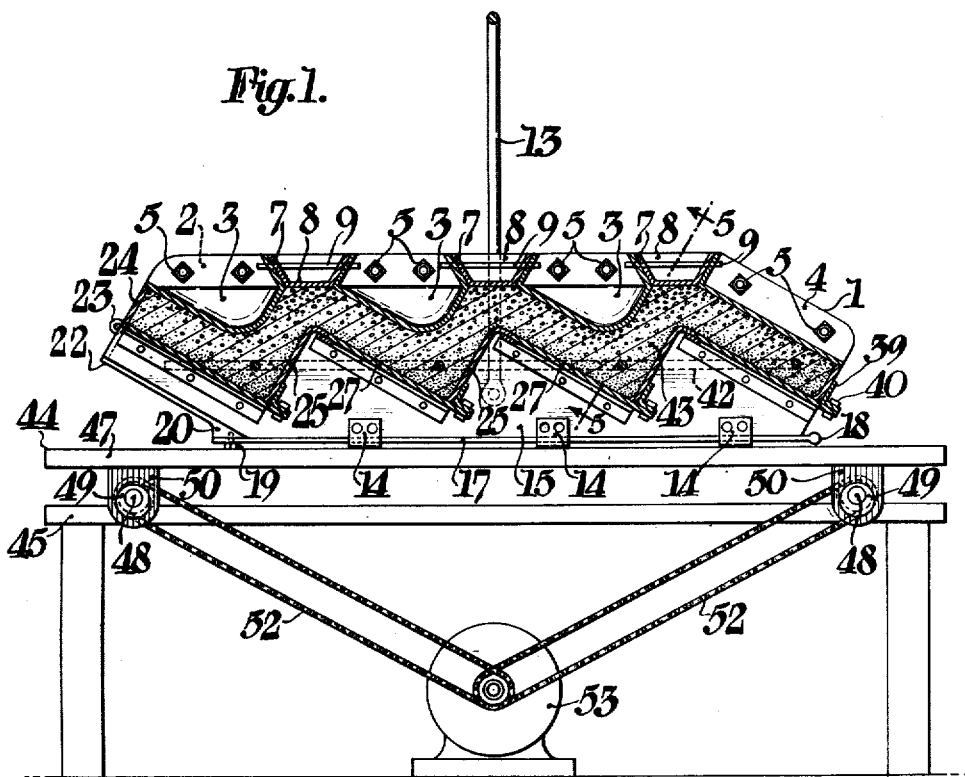
Figure 2:
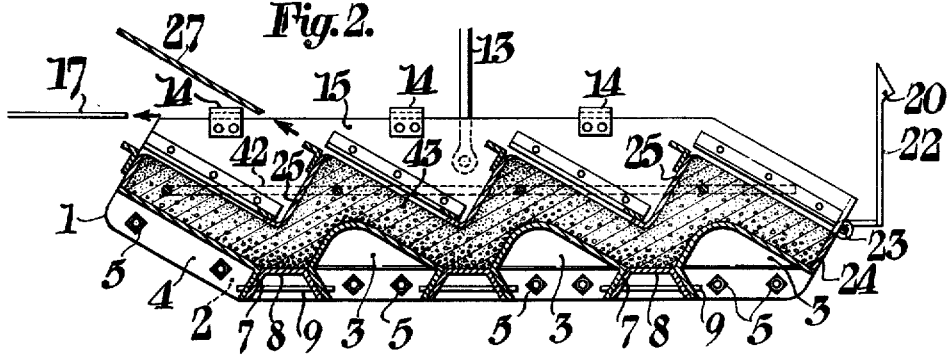

Patented June 6, 1939

2,161,755

UNITED STATES PATENT OFFICE 2,161,755

MANUFACTURE OF TITANIUM PIGMENTS

Robert William Ancrum, Stockton-on-Tees, and Assur Gjessing Oppegaard, Billingham, England, assignors, by mesne assignments, to Titan Company Inc., Wilmington, Del., a corporation of Delaware No Drawing. Application July 22, 1937, Serial No. 155,040. In Great Britain August 7, 1936

9 Claims. (Cl. 134—58)

This invention relates to the manufacture of titanium pigments.

A principal object of the invention, among others, is to produce titanium pigments which have particularly good properties with regard to softness, fastness to light, and stability in film-forming vehicles of different kinds.

The methods of preparation of titanium dioxide pigments commonly in use are based on the hydrolytic precipitation of hydrous titanium oxide from solutions of titanium salts (particularly titanium sulphate), the precipitate being washed, dried and calcined to remove the water and acid and to develop and/or change the crystalline structure, preferably to a crypto-crystalline condition, in order to improve the opacity and other pigment properties. The exact composition of the precipitate varies, but it consists essentially of hydrated titanium compounds containing hydroxyl groups and a small amount of absorbed or combined acid.

Prior to calcination, the precipitate may be dried so as to drive off the mechanically admixed water and acid and in addition more or less of the chemically combined water and acid. It is convenient to refer to these products as "hydrated titanium compounds" and this term will be used in this specification to include the product obtained by the hydrolytic precipitation of titanium salt solutions.

In normal practice the calcination, or heat treatment is carried out at temperatures within the range of 700° to 1000° C., the exact temperature which will give the best results depending on the precise nature of the precipitate and the particular properties which it is desired the final product should have. The intensity of the calcination may be increased by increasing the time or the temperature or both, and it has been found that whilst some properties increase progressively with an increase in the intensity of the calcination, other properties increase up to a certain point, and then decrease. For example, it has been found that the tinting strength of the pigment normally increases with an increase in the intensity of the calcination up to a certain point, but beyond this point it is again reduced. On the other hand, it has been found that there is a progressive increase with an increase in the intensity of the calcination in the stability of the pigment in vehicles of different kinds; that is, an increase in the ability of the pigment to form stable films with film-forming vehicles. When a film containing titanium pigments has been formed, it will, when exposed to outside atmospheric conditions for some time, in many cases, begin to disintegrate or, as usually stated in the industry, "chalk" on the surface, thus wearing away and exposing the underlying parts to a similar disintegration. Furthermore, when mixed in a film with other "colors", particularly organic dyestuffs, titanium pigments often exhibit a tendency to accelerate the fading of such other "colors" when exposed to light, particularly sunlight.

It has been further found that when the calcination or heat treatment is intensified in order to increase the tinting strength, there is a tendency for the pigment to acquire a greyish, yellowish or reddish tone, and also, in some cases, a lack of fastness to light. A still further increase in the intensity of the calcination, in order to obtain a pigment giving films of great durability normally results in a drop in tinting strength and also in the pigment acquiring excessive hardness which renders it unsuitable for use as a pigment.

Many methods have been proposed for overcoming the above-mentioned difficulties. An important method is the addition of certain compounds to the washed precipitate of hydrous titanium oxide prior to calcination. The compounds added are usually phosphoric acid and phosphates of different kinds, fluorine compounds and water-soluble alkali metal compounds. For convenience such compounds have been called "addition agents". When such added compounds tend to develop certain desirable properties in the calcined pigment, e. g. softness and texture, as do certain alkaline alkali metal compounds such as sodium and potassium carbonate they have been termed "conditioning agents".

We have now found that a titanium pigment having improved pigment properties as compared with a similar prior art product with respect to texture, softness, light stability, stability in vehicles, light reflectance properties, i. e. a neutral or blue tone without appreciable lowering the average total light reflected (brightness) may be prepared by calcining or heat treating a mixture of hydrated titanium compounds or titanium oxide and a reactive antimony compound, as hereinafer defined, at a sufficient temperature and for a sufficient length of time to develop the pigmental properties, preferably so as to obtain a pigment with a crypto-crystalline structure. The proportion of antimony compound to hydrous titanium oxide may vary within wide limits depending upon the refastness to light, great softness, and gives films of high durability.

Example III

Hydrous titanium oxide pulp similar to that of Example I has 10.0% of antimony trioxide and 0.4% of potassium carbonate added to it, the additions being calculated on the $TiO_2$ content and is then calcined for about 3 hours at about 1000° C. The product possesses high fastness to light and stability, and great softness.

Example IV

Hydrous titanium oxide pulp similar to that of Example I has 2.0% of antimony pentoxide and 0.35% of potassium carbonate added to it, the additions being calculated on the $TiO_2$ content, and is then calcined for about 3 hours at about 980° C. The product obtained has a good white, neutral tone, a high fastness to light and gives films of high durability.

Example V

Hydrous titanium oxide pulp obtained by precipitation from a titanium tetrachloride solution and subsequent washing has added to it 1.0% antimony trioxide and 0.4% of potassium carbonate, the additions being calculated on the $TiO_2$ content, and is then calcined for about 3 hours at about 980° C. The product has a good white and neutral tone, fastness to light, great softness, and gives films of high durability.

In the above examples the reference is to a constant temperature calcination for example in a stationary muffle furnace or crucible. As, however the calcination in practice normally is carried out in a rotary kiln, the temperature to which the material is submitted increases during the passage through the kiln, and the final temperature may be as high as 1100°–1200° C. The material will however be kept at this temperature for only a comparatively short time, and calcination in a rotary kiln with temperatures increasing up to 1100° C. may be considered as corresponding to a constant temperature calcination at 1000° C. for 3 hours. In general the preferred calcination temperatures are from about 900° C. to about 1100° C.

When a conditioning agent, e. g. potassium carbonate, is employed to impart conjointly with the antimony compound the desired softness and other pigment properties, only small amounts need be used. Seldom should amounts over 2.0% or under 0.05% be employed.

Normally it is preferable to add the antimony to the precipitated and washed titanium hydrate, but it may be added at an earlier stage in the process, for instance, antimony, e. g. antimony trioxide, antimony pentoxide or tartar emetic, may be added to the titanium salt solution before precipitating hydrous titanium oxide. The antimony in the solution combines with the titanium hydrate and will, therefore, be present during the subsequent calcination. The antimony may be added at a still earlier stage in the process, for instance, to the titanium ore before the ore is dissolved in acid. The antimony will then normally remain in solution together with the titanium until the precipitation stage when the antimony will be precipitated in combination with the hydrous titanium oxide.

The foregoing description of our invention has been given for clearness of understanding and no undue limitations are to be deduced therefrom but the appended claims should be construed as broadly as possible in view of the prior art.

We claim:

1. Process for the preparation of titanium dioxide pigments possessing improved pigment properties which comprises calcining in the absence of amounts of alkali metal compounds exceeding about 2% hydrated titanium-oxygen compounds intimately associated with an antimony-oxygen compound, the latter being present in amounts equal to between 0.1 percent and 55 percent Sb based on the $TiO_2$ content of the hydrated titanium-oxygen compounds at temperatures between about 900° C. and 1100° C. for sufficient length of time to develop the pigment properties of the titanium dioxide.

2. Process for the preparation of titanium dioxide pigments possessing improved pigment properties which comprises calcining hydrated titanium-oxygen compounds intimately associated with antimony trioxide and potassium carbonate, the antimony trioxide being present in amount between 0.1 percent and 10.0 percent and the potassium carbonate being present in amounts between 0.05 percent and 2.0 percent, both amounts being based on the $TiO_2$ content of the hydrated titanium-oxygen compounds at temperatures between about 900° C. and 1100° C. for sufficient length of time to develop the pigment properties of the titanium dioxide.

3. Process for the preparation of titanium dioxide pigments possessing improved pigment properties which comprises calcining in the absence of amounts of alkali metal compounds exceeding about 2% hydrated titanium-oxygen compounds intimately associated with antimony trioxide in amounts equal to between 0.1 percent and 20.0 percent Sb based on the $TiO_2$ content of the hydrated titanium-oxygen compounds at temperatures between about 900° C. and 1100° C. for a sufficient length of time to develop the pigment properties of the titanium dioxide.

4. Process for the preparation of titanium dioxide pigments possessing improved pigment properties which comprises calcining in the absence of amounts of alkali metal compounds exceeding about 2% hydrated titanium-oxygen compounds intimately associated with antimony pentoxide in amounts equal to between 0.1 percent and 20.0 percent Sb based on the $TiO_2$ content of the hydrated titanium-oxygen compounds at temperatures between about 900° C. and 1100° C. for a sufficient length of time to develop the pigment properties of the titanium dioxide.

5. A titanium dioxide pigment possessing a neutral to blue tone, a soft and smooth texture, fastness to light, stability and durability in paint films, and substantially no tendency to promote the fading of organic dyestuffs comprising particles of titanium dioxide having combined therewith an amount of antimony analyzing between 0.1 percent and 55 percent Sb based on the weight of the $TiO_2$, said pigments containing less than about 2% of combined alkali metal calculated as alkali metal carbonate.

6. A titanium dioxide pigment possessing a neutral to blue tone, a soft and smooth texture, fastness to light, stability and durability in paint films, and substantially no tendency to promote the fading of organic dyestuffs comprising particles of a pigment forming titanate having combined therewith an amount of antimony analyzing between 0.1 percent and 55 percent Sb based on the weight of the $TiO_2$, said pigments containing less than about 2% of combined alkali metal calculated as alkali metal carbonate.

7. Process for the preparation of titanium dioxide pigments possessing improved pigment properties which comprises calcining hydrated titanium-oxygen compounds intimately associated with not more than about 2% of a water-soluble alkaline alkali metal compound and an amount of an antimony compound selected from the group consisting of antimony-oxygen compounds and compounds of antimony which on calcination yield antimony-oxygen compounds equivalent to between about 0.1 percent and about 55 percent Sb based on the titanium calculated as $TiO_2$ contained in the hydrated titanium-oxygen compounds at temperatures between about 900° C. and about 1100° C. for sufficient length of time to develop the pigment properties of the titanium dioxide.

8. Process for the preparation of titanium dioxide pigments possessing improved pigment properties which comprises forming a titanium salt solution from a mixture of a titaniferous ore and an amount of a compound of antimony selected from the group consisting of antimony-oxygen compounds and compounds of antimony which on calcination yield antimony-oxygen compounds equal to between about 0.1 per cent and 55 per cent Sb based on the titanium content of the said ore, calculated as $TiO_2$, reducing and clarifying the solution, subjecting it to hydrolytic decomposition, filtering and washing the precipitate and calcining it in the absence of amounts of alkali metal compounds exceeding about 2 per cent at temperatures between about 900° C. and 1100° C. for a sufficient length of time to develop the pigment properties of the titanium dioxide.

9. Process for the production of titanium dioxide pigments possessing improved pigment properties which comprises adding to a mineral acid solution of titanium an amount of a compound of antimony selected from the group consisting of antimony-oxygen compounds and compounds of antimony which on calcination yield antimony-oxygen compounds equal to between about 0.1 per cent and 55 per cent Sb based on the titanium content of the said solution, calculated as $TiO_2$, subjecting the solution to hydrolytic decomposition, filtering and washing the precipitate and calcining it in the absence of amounts of alkali metal compounds exceeding about 2 per cent at temperatures between about 900° C. and 1100° C. for a sufficient length of time to develop the pigment properties of the titanium dioxide.

ROBERT WILLIAM ANCRUM.
ASSUR GJESSING OPPEGAARD.

DISCLAIMER 2,161,755.—*Robert William Ancrum*, Stockton-on-Tees, and *Assur Gjessing Oppegaard*, Billingham, England. MANUFACTURE OF TITANIUM PIGMENTS. Patent dated June 6, 1939. Disclaimer filed August 23, 1940, by the assignee, *Titan Company, Inc.*

Hereby enters this disclaimer to claims 1, 2, 3, 5, and 7 in said patent.

[*Official Gazette September 17, 1940.*]

June 13, 1939.  F. KOGL  2,161,822
APPARATUS FOR PRECASTING CONCRETE STAIR STRUCTURES
Filed Sept. 23, 1937  2 Sheets-Sheet 1

INVENTOR:
Frank Kogl,
BY
ATTORNEY.

June 13, 1939. F. KOGL 2,161,822
APPARATUS FOR PRECASTING CONCRETE STAIR STRUCTURES
Filed Sept. 23, 1937 2 Sheets-Sheet 1
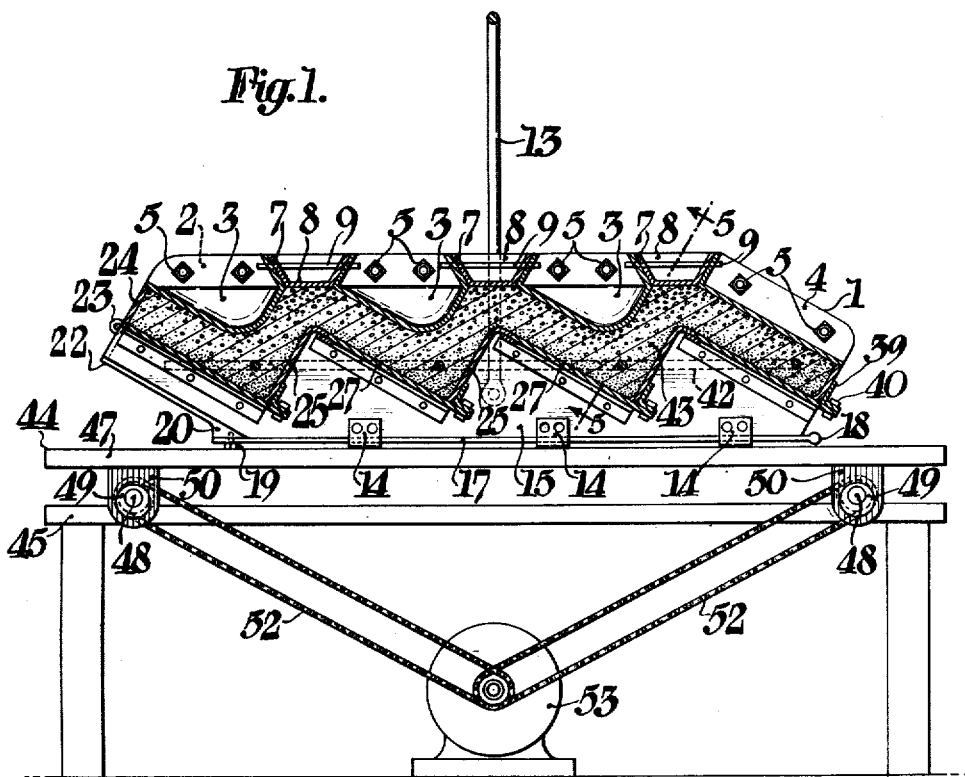
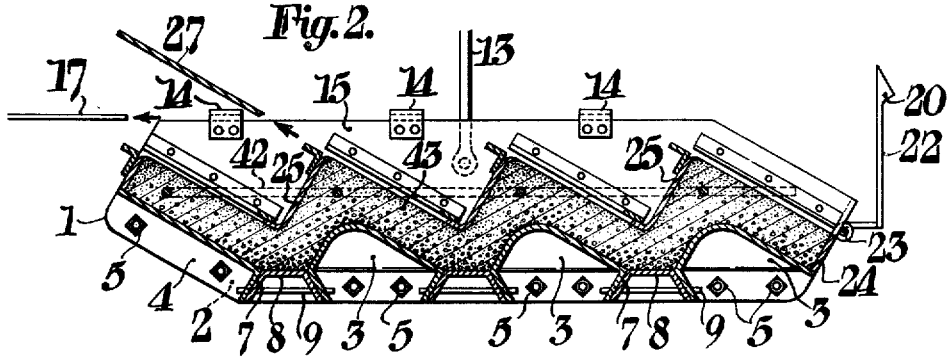
INVENTOR:
Frank Kogl,
BY
ATTORNEY.